UNITED STATES PATENT OFFICE.

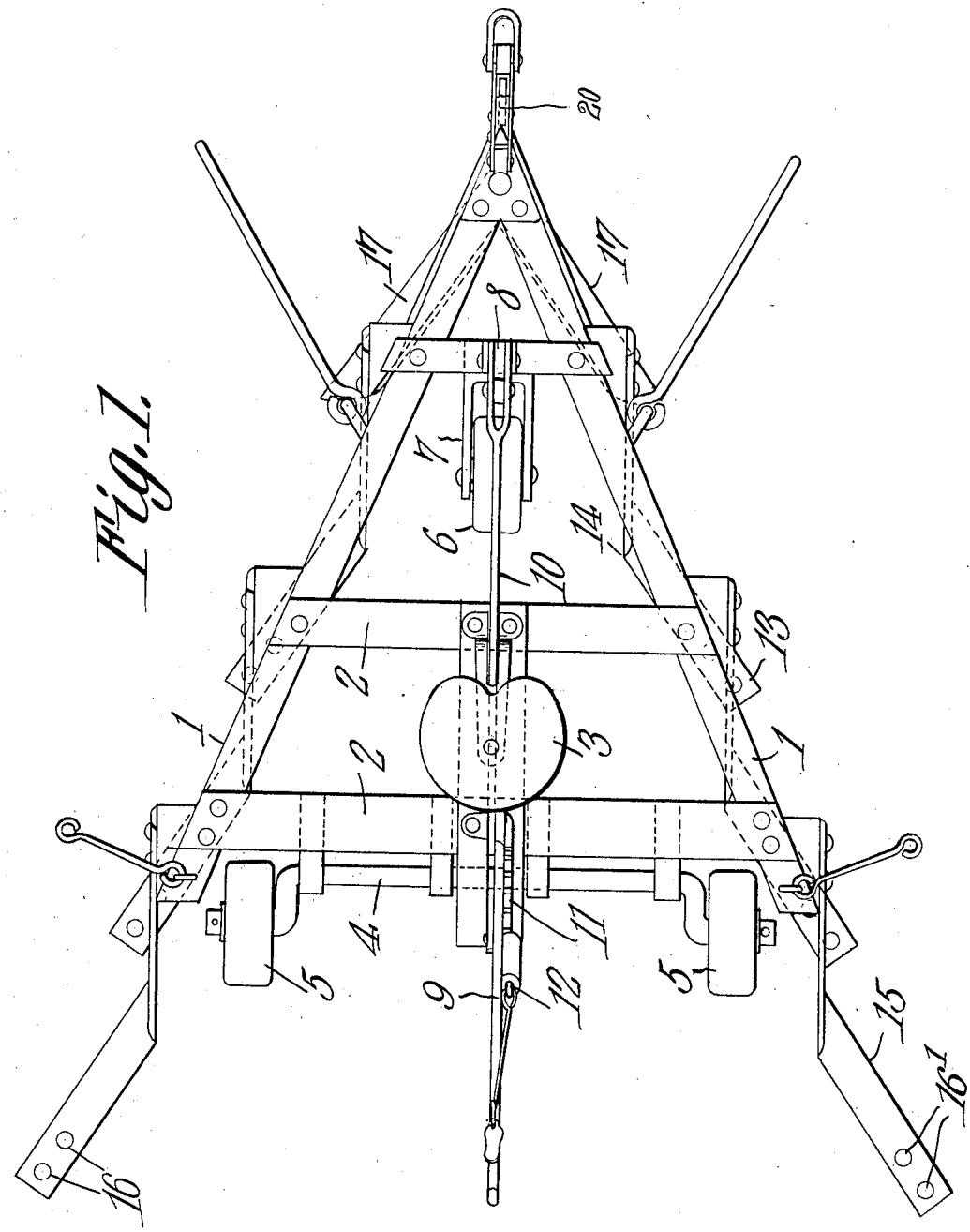

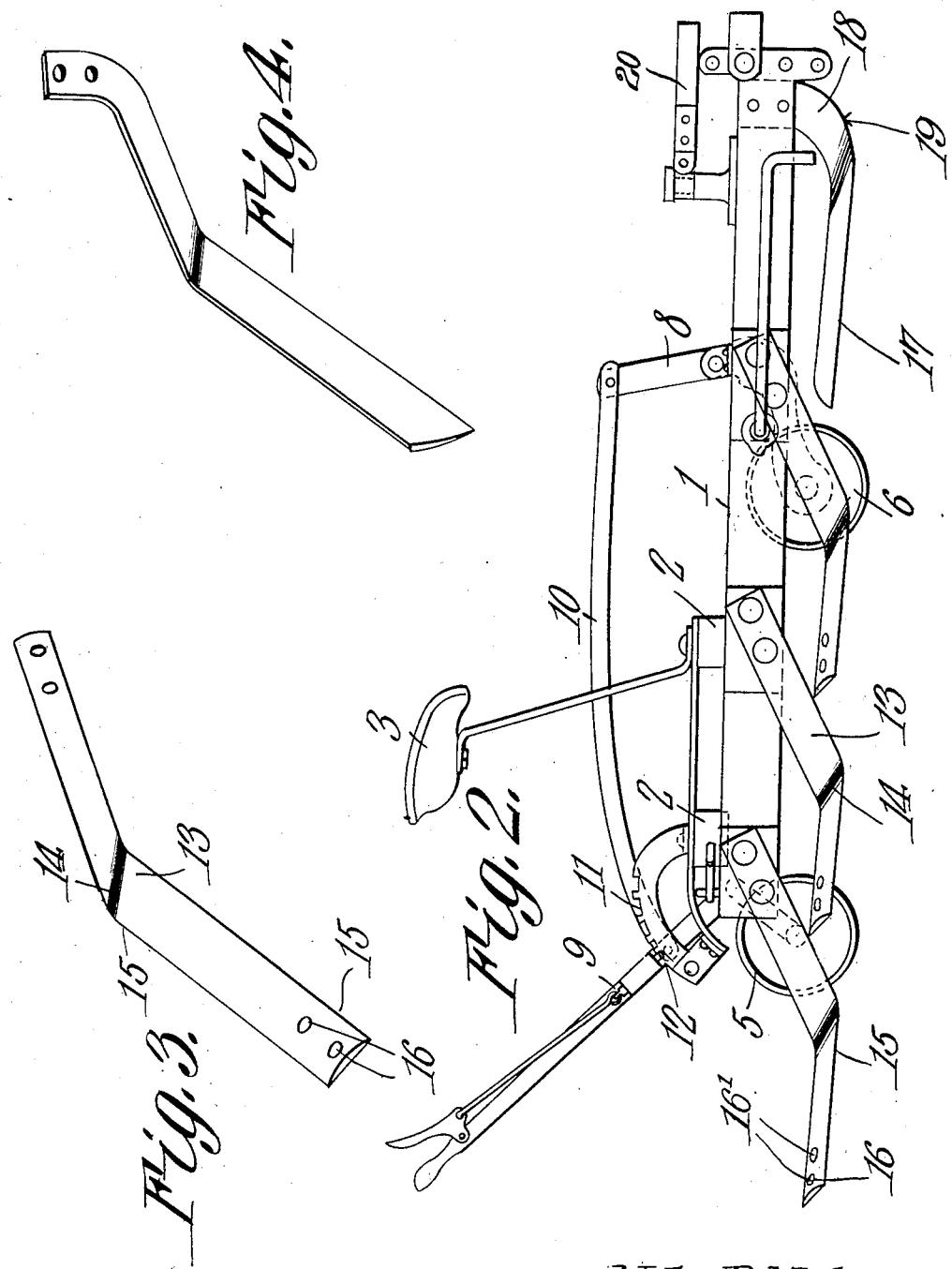

NELS P. NELSON, OF LEXINGTON, OREGON.

WEEDER OR CULTIVATOR.

No. 875,946.   Specification of Letters Patent.   Patented Jan. 7, 1908.

Application filed March 28, 1907. Serial No. 365,053.

*To all whom it may concern:*

Be it known that I, NELS P. NELSON, a citizen of the United States, residing at Lexington, in the county of Morrow and State of Oregon, have invented a new and useful Weeder or Cultivator, of which the following is a specification.

This invention has relation to weeders or cultivators and it consists in the novel construction and arrangement of its parts hereinafter shown and described.

The object of the invention is to provide a weeder having a series of cutting blades which are so positioned upon the frame as to operate upon the roots or stalks of the vegetation in a shearing manner; that is to say, the blades are so twisted and disposed that they present no vertical edges to the plants which are consequently severed and destroyed with the expenditure of a minimum amount of energy.

The harrow is preferably made up of a series of triangular sections suitably coupled together and being so arranged that their apices are disposed to the front. The said blades are arranged upon the lateral sides of the sections and hence are not alined and any plants that are but partly severed by a preceding blade will surely be severed by the next succeeding blade.

In the accompanying drawing:—Figure 1 is a top plan view of the weeder. Fig. 2 is a side elevation of the same. Fig. 3 is a perspective view of one form of blade, and Fig. 4 is a perspective view of a modified form of blade.

The harrow consists of a number of triangular sections suitably coupled together, the said sections are preferably triangular in plan and are disposed with their apices to the front. As the said sections are substantially alike a description of one will answer for all.

The frame of the section is made up of the side pieces 1, 1 which are connected together by the cross pieces 2, 2 an operator's seat 3 is mounted upon the cross pieces 2. The U-shaped axle 4 is beveled upon the rear cross piece 2 and the wheels 5 are journaled upon the end of said axle. The caster wheel 6 supports the forward end on the harrow section and is journaled to the yoke 7 which in turn is pivoted to the lower end of the lever 8. The lever 9 is fixed at its lower end to the axle 4 and the link 10 connects the said levers 8 and 9 together and affords a means whereby the movement of one lever correspondingly moves the other lever. The gear segment 11 is mounted adjacent the lever 9 and said lever 9 is provided with a spring actuated pawl 12 which engages the said gear segment.

From the foregoing description it is obvious that by swinging the lever 9 that the frame of the harrow section may be raised or lowered as desired.

The sides 1 of each harrow section are provided with cutting blades of peculiar arrangement and configuration and arranged in series while each section is provided at its forward end with a blade having diverging end portions which merge into a common forward portion which is curved along its longitudinal axis. The side blades are reversible and are preferably made from elongated strips of metal having their longitudinal edges sharpened. The said strips are bent on a diagonal line at their middles so that their end portions lie in planes at an obtuse angle to each other and the end portions of the strips are secured to the side pieces 1 in such a manner that the opposite end portion will be disposed at an acute angle to the surface of the ground. As the said blades are attached to the sides of the side pieces 1 and as said side pieces are disposed at an angle to each other the said blades are not in alinement with each other consequently the vegetation that is partially severed by the forward blade is completely severed by the next succeeding blade.

As above intimated the preferred form of the blade 13 is that of an elongated parallelogram which is bent into end portions upon the median digaonal line 14. The longitudinal edges of the blade are sharpened as at 15 and the blade is provided at each of its ends with the perforations 16 through which bolts may be passed for attaching the blade to the harrow section. Thus a blade having similar end portions and opposite cutting edges is provided. The said blade may be reversed so that when one cutting edge has become dull the other said edge may be presented to the work. It is also apparent that by reason of a peculiar manner in which the blades are mounted upon the side pieces 1 and the relative position of the portions of the blades that no vertical surfaces are presented to the vegetation and hence, the cutting edges will pass over the same and not collect or drag stalks or trash. At the same time the plants will be severed with a shearing cut. Also by reason of the fact that the cutting edges of all of the blades upon one of the side pieces 1 are parallel, the plants are all operated upon in the same direction and are not partly severed in one direction and partly severed in the opposite direction. The advantage of presenting the cutting edges to the plants in the same direction is that should the plant be in soft earth it will not be pushed aside laterally first in one direction and then in the opposite direction but will be completely severed by one of the cutting blades bearing directly down upon the same.

In the form of blade as shown in Fig. 4 the opposite end portions of the blade are not of the same configuration. This blade has but a single cutting edge and consequently is not reversible, its cutting end however, is so positioned as to operate upon the plants in the manner above described. This blade is not reversible. The front blade of each harrow section is provided with the diverging ends 17 which are sharpened at their forward edges and are disposed at acute angles to the surface of the ground. The forward ends of the end portions 17 merge into the forward end portion 18 which is curved along its longitudinal axis and is sharpened at its front edge as at 19. The upper ends of the portion 18 is secured to the harrow section in advance of the apex thereof. Each section is provided with a tongue 20 and the portions 15 and 17 of the blades are slightly elevated at their rear ends. The plugs 16' are used to close the perforations 16 in the blade sections 15 in order to keep the said perforations free from dirt, etc.

Having described my invention, what I claim as new and desire to secure by Letters-Patent is:—

An implement as described comprising a cuneate frame, a blade mounted at the forward end thereof and having a rearwardly curved sharpened portion provided with binate rearwardly disposed diverging inclined end portions having sharpened edges, inclined cutting blades mounted upon the sides of the frames behind the first said blade, the free ends of the cutting blades on each side of the frame extending in the same general direction, and the free end of each blade on each side of the frame overlapping the next blade in the rear in the line of draft of the implement and at the attached end of the rear blade.

In testimony that I claim the foregoing as my own, I have hereto affixed my signature in the presence of two witnesses.

NELS P. NELSON.

Witnesses:
  W. G. SCOTT,
  W. P. MCMILLAN.